United States Patent [19]
Vaara

[11] Patent Number: 5,913,169
[45] Date of Patent: Jun. 15, 1999

[54] CELLULAR MOBILE STATION SYSTEM

[75] Inventor: Tomi Vaara, Espoo, Finland

[73] Assignee: Nokia Telecommunications Oy, Espoo, Finland

[21] Appl. No.: 08/860,623

[22] PCT Filed: Dec. 12, 1995

[86] PCT No.: PCT/FI95/00676

§ 371 Date: Jun. 13, 1997

§ 102(e) Date: Jun. 13, 1997

[87] PCT Pub. No.: WO96/19087

PCT Pub. Date: Jun. 20, 1996

[30] Foreign Application Priority Data

Dec. 15, 1994 [FI] Finland .................................... 945909

[51] Int. Cl.⁶ .................................................. H04B 1/00
[52] U.S. Cl. ......................................... 455/443; 455/562
[58] Field of Search ..................................... 455/443, 446, 455/447, 448, 449, 7, 14, 525, 561, 562

[56] References Cited

U.S. PATENT DOCUMENTS

| | | | |
|---|---|---|---|
| 3,916,311 | 10/1975 | Martin et al. | 455/14 |
| 5,235,632 | 8/1993 | Raith | 455/448 |
| 5,404,570 | 4/1995 | Charas et al. | 455/446 |
| 5,537,637 | 7/1996 | Sugita et al. | 455/14 |
| 5,603,080 | 2/1997 | Kallander et al. | 455/14 |

FOREIGN PATENT DOCUMENTS

| | | |
|---|---|---|
| 4335345 | 4/1995 | Germany . |
| 92/02104 | 2/1992 | WIPO . |

*Primary Examiner*—Reinhard J. Eisenzopf
*Assistant Examiner*—Makoto Aoki
*Attorney, Agent, or Firm*—Pillsbury Madison & Sutro LLP

[57] ABSTRACT

A cellular mobile station system wherein a handover decision is based on measuring downlink transmissions of a serving cell and neighboring cells by a mobile station. Adjacent cells are typically arranged to be partly overlapping so as to ensure there is a sufficient period of time for the reception and decoding of the downlink transmissions of the neighboring cells, as well as for a handover decision. In some of the cells, there may be terrain obstacles, buildings, tunnels or the like obstacles shadowing the downlink transmission of the neighboring cell so that overlapping is not sufficient between such a cell and a neighboring cell. A repeater or an antenna is provided for extending the coverage area of the downlink transmission of the shadowed neighboring cell in such a cell so as to allow an advanced transmission and decoding of the downlink transmission of the shadowed neighboring cell.

7 Claims, 1 Drawing Sheet

CELLULAR MOBILE STATION SYSTEM

This application is the national phase of international application PCT/FI95/00676, filed Dec. 12, 1995 which was designated the U.S.

1. Field of the Invention

The invention relates to a cellular mobile station system wherein a handover decision is based on measuring downlink transmissions of a serving cell and neighboring cells by a mobile station. Adjacent cells are typically arranged to be in a partially overlapping configuration so as to ensure that there is a sufficient period of time for the reception and decoding of the downlink transmissions of the neighboring cells for a handover decision.

2. Background of the invention

In cellular mobile station systems, a mobile station, in which a call is established, that is, which is using a traffic channel, measures constantly the quality and/or the strength of the downlink signal from a serving base station. The serving base station also informs the mobile station of the neighboring cells/base stations and of their control channel frequencies. On the basis of this information, the mobile station is able to measure also the control channel frequencies of the neighboring base stations during a call. The measuring results are stored into the mobile station and/or are transmitted to the mobile station network for the handover decision depending on whether the handover decision is made by the mobile station or by the mobile station network. A handover refers to a switching of a call from one traffic channel to another during a call.

The base stations of the cellular network constantly broadcast information about themselves and their surroundings. This information includes a cell or base station identifier, based on which the mobile station is able to identify the neighboring cell to be measured. The cell or base station identifier is also transmitted to the cellular network in possible measuring reports. The mobile station has to decode the cell or base station identifier of a neighboring cell before this cell can be used as a potential target cell for a handover. In order that the mobile station would have a sufficient period of time to decode the cell or base station identifier and that way allow the handover, the adjacent cells of the cellular mobile station system must have overlapping areas. Besides the acceptable decoding time of the cell or base station identifier, the size required of the overlapping area of two adjacent cells depends, e.g., on the speed of the mobile station and the parameters of handover algorithm, such as, the size of the time window used for averaging the measured signal levels of the neighboring cell, for example.

If the overlapping area of two adjacent cells is so small that the handover cannot be made, the call is lost. One reason for a lost call is an undecoded cell or base station identifier of the neighboring cell. The overlapping requirement of cells is significant especially in microcells in which the diameter is some hundreds of meters. It is, however, difficult to arrange a sufficiently large overlapping area in places where terrain obstacles, buildings or the like obstacles obstructing the propagation of radio signals are shadowing the transmission of the neighboring cell. Such problematic places are found, for example, in tunnels, at street corners and inside buildings. For example, when a mobile station comes fast out of a tunnel, the neighboring cell outside the tunnel may develop an immediate need for a handover but the cell or base station identifier of the neighboring cell outside the tunnel is undecoded and the call is lost because a handover to the neighboring cell cannot be made. This situation is illustrated in more detail by means of an example with reference to FIG. 1.

In FIG. 1 the serving cell is indicated by the reference character S and the neighboring cell by the reference character A. The serving cell is, for example obstructed by a tunnel 3 so that cell S extends somewhat outside the tunnel at the opening of the tunnel. The neighboring cell A is a cell outside the tunnel and the radio coverage of cell A does not extend essentially inside the tunnel. Thus, cells S and A have a very small overlapping area OA. A mobile station MS measures all the neighboring cells specified for the serving cell S and transmits the measuring results to the cellular network. The measuring result includes, e.g., the field strength of the downlink signal of the neighboring cell and the cell or base station identifier of the neighboring cell. This information about the neighboring cell is transmitted to the cellular network if the mobile station is able to receive the downlink signal of said cell. When the MS reaches the radio coverage of cell A in position (1), it can receive the downlink signal of cell A and start decoding the cell or base station identifier of cell A. As it has not yet been possible for the mobile station MS to decode the cell or base station identifier, the information about the neighboring cell is insignificant in the measuring result as it cannot be made certain that the measurings concern the correct cell, for which reason the neighboring cell cannot be used as a target cell in a case of a handover. In position (2), the cellular network detects the need for a handover, for example, due to the low reception level of the serving cell S. If the overlapping area OA of cells S and A is so small that the mobile station MS reaches the coverage area of cell S at position (2) before the base station identifier of the neighboring cell A is decoded, a handover to cell A cannot be made and the call will be lost.

At present in cellular systems, there are some solutions for eliminating this problem. The size of the cell can be enlarged and antennas can be directed so that required cell overlapping is achieved. These solutions cause some other problems, especially in network planning. The enlargement in the coverage area of cell S can cause co-channel interference in some parts of the network. In a case in which the coverage area of cell A is enlarged, the advantage gained by microcells is lost, besides which co-channel interference may occur. The openings produced by directing the antenna of cell A towards cell S have to be filled from other cells.

SUMMARY OF THE INVENTION

The object of the present invention is to provide a new method for relieving or eliminating the problem mentioned above.

This is achieved with a cellular mobile station system disclosed in the foregoing Background section which is according to the invention characterized in that a first cell, in which terrain obstacles, buildings, tunnels or the like obstacles obstructing the propagation of radio signals are shadowing the downlink transmission of one of the neighboring cells so that overlapping is not sufficient between the first cell and a respective one of the neighboring cells, is provided with a repeater or an antenna of the respective one of the neighboring cells which extends in the first cell the coverage area of the downlink transmission of the respective one of the neighboring cells for an advanced transmission and decoding of the downlink transmission of the respective one of the neighboring cells.

The basic idea of the present invention is to render it possible for a mobile station to detect a neighboring cell and decode a cell identifier, such as a base station identifier before the mobile station can listen to the actual downlink transmission of the neighboring cell. Because of this, the size requirements of the overlapping areas of cells are not as great in relation to the actual coverage areas as especially in the microcell areas of the prior art solutions. The advanced detection and decoding of a neighboring cell according to the invention is brought about by extending the coverage area of the neighboring cell to the area of the cell serving only in the downlink direction in which the obstacles obstructing the propagation of radio signals are shadowing the downlink transmission of the neighboring cell. As the object of the extension of the neighboring cell is only to prepare for a fast handover, an equivalent extension need not be made in the uplink direction. The advanced detection of a neighboring cell and the decoding of the base station identifier according to the invention allow the neighboring cell to be selected as a potential target cell of a handover, even before arriving in the actual coverage area of the neighboring cell, and thereby ensuring a fast handover and maintaining the call, even if there would not be enough time to decode the base station identifier from the actual downlink transmission of the neighboring cell. The invention can be implemented over existing network planning without having to change the cells of the existing network planning in any way. This is a significant advantage, because, especially in a microcell environment, it is difficult to redo network planning, for example, the extension of cells may disturb other microcells.

BRIEF DESCRIPTION OF THE DRAWINGS

The invention is described in more detail by means of preferred embodiments with reference to the accompanying drawing, in which.

DETAILED DESCRIPTION OF PREFERRED EMBODIMENTS OF THE INVENTION

The present invention is applicable to any cellular mobile station network in which the mobile station performs the measuring of neighboring cells for handover and requires sufficient overlapping of the coverage area of the cells so as to ensure there is a sufficient period of time for the reception and decoding of the downlink signal of the neighboring cell. In the following, the invention will be described by using the GSM mobile station system as an example without restricting the invention thereto.

Figure 2:
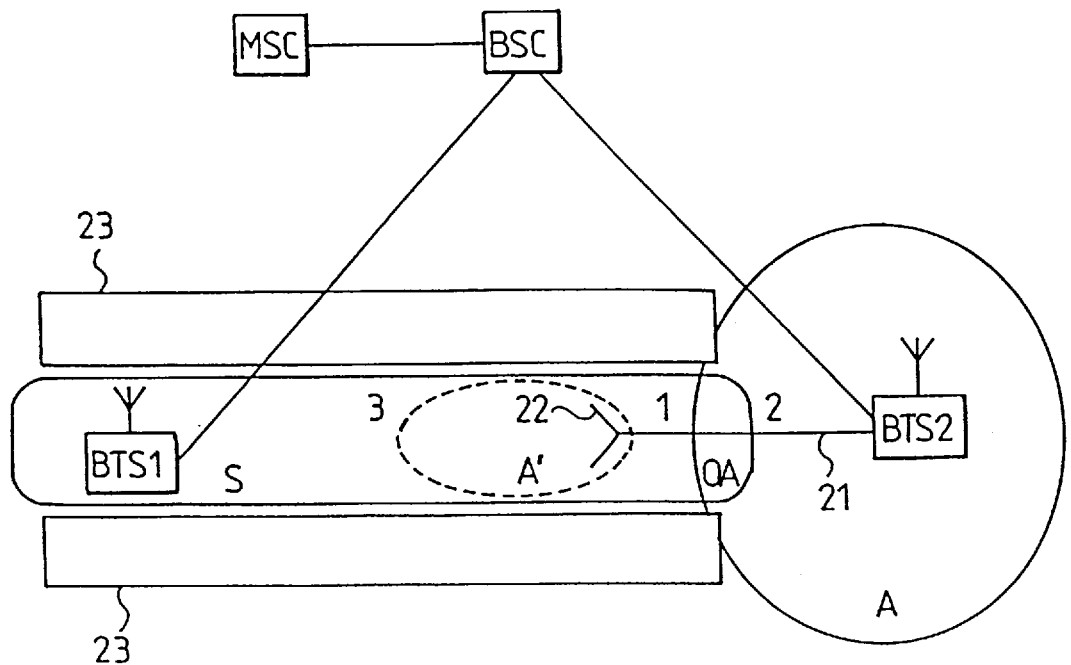
FIG. 2 illustrates a cellular mobile station system in which the extension of the downlink direction of the neighboring cell according to the invention is accomplished in the tunnel cell.

GSM (Global System for Mobile-Communications) is a pan-European digital mobile station system. FIG. 2 discloses only some basic structures of the GSM system, without further specifying the properties and other parts of the system. With regard to a more detailed description of the GSM system, a reference is made to the GSM Specifications and to *The GSM System for Mobile Communications*, by M. Mouly & M. Pautet, Palaiseau, France, 1992, ISBN:2-9507190-0-0-7.

A mobile services switching center MSC attends to the switching of incoming and outgoing calls. It performs similar tasks to a public switched telephone network center. In addition to the above, it performs functions characteristic of only mobile telephone traffic, such as subscriber location management. Mobile radio stations or mobile stations MS are connected to the center MSC by means of base station systems BSS. The base station system BSS comprises a base station controller BSC and base stations BTS. One base station controller BSC is used for controlling several base stations BTS. A function of the BSC is, e.g., handovers in cases in which a handover is made inside the base station or between two base stations that are both under the control of the same BSC. For the sake of clarity, only one base station system BSS is shown in FIG. 2, in which two base stations BTS1 and BTS2 are connected to the base station controller BSC. The radio coverage areas of the base stations comprise corresponding radio cells S and A.

The mobile station MS with an ongoing call constantly measures the quality or level of the signal received from the serving cell and the reception level of the control channel frequencies of neighboring cells in order to prepare for handovers. The serving cell notifies the mobile station which neighboring cells it should measure. In the GSM system, the control channel carrier waves the mobile stations listen to and measure are called broadcast control channels BCCH. In order that the mobile station MS can distinguish the cell with the same BCCH carrier wave, a base station identity code BSIC is included in the BCCH transmission. It is possible that the MS receives in some cases two BCCH transmissions from different cells on the same carrier wave frequency. As was mentioned earlier, the mobile station MS is provided with a list of the carrier wave frequencies it should observe for measuring neighboring cells. In a report message, which the mobile station regularly transmits to the serving base station BTS and which contains at most the measuring results of six neighboring cells, the mobile station has to inform the BSIC of every measured BCCH carrier wave on which it reports measuring results. This means that the mobile station has to decode a synchronization channel SCH on the BCCH carrier wave to find out the BSIC of the neighboring cell. The base station controller BSC, to which the base station BTS transmits the measuring reports from the mobile station MS, is able to check in uncertain cases which cell has actually been measured. If the BSIC of the BCCH carrier wave has not been decoded, the measuring results of said BCCH carrier wave will not be reported further and the neighboring cell related thereto cannot be selected as a potential target cell of handover.

Figure 1:
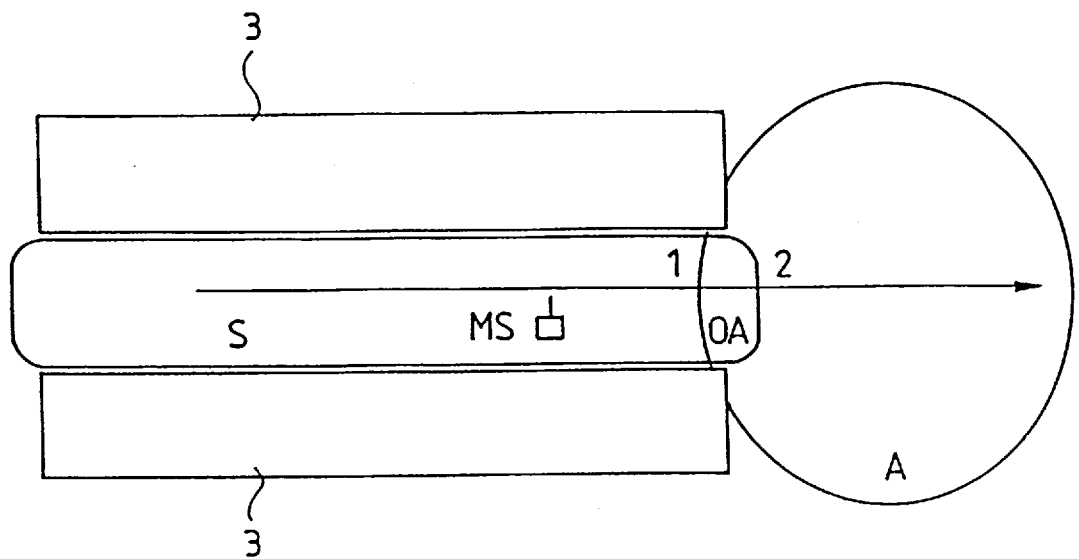
FIG. 1 illustrates a handover situation in a mobile station system of the prior art when moving from a cell inside the tunnel to a cell outside the tunnel.

In the cellular system of FIG. 2, cell S of the base station BTS1 is a cell obstructed inside a tunnel 23 the coverage area of which extends only a little outside the opening of the tunnel. Correspondingly, cell A of the base station BTS2 is a cell outside the tunnel 23 the coverage area of which does not at all extend inside the tunnel 23. Thus the overlapping area OA of cells S and A is very small and it does not provide the mobile station MS with enough time in all situations to measure and decode the BCCH carrier wave of the base station BTS2 when the mobile station MS is moving from the tunnel to the overlapping area OA. This may be followed by a handover failure and a loss of the call, as was explained in connection with FIG. 1.

In accordance with the invention, an extended coverage area A' is formed for the downlink BCCH signal inside cell S in the area in which the tunnel 23 obstructs the extent of the actual coverage area A of the base station BTS2. This extension area A' is achieved with a repeater and a directional antenna 22 which are positioned inside the tunnel 23 and cell S outside cell A. The repeater and antenna 22 are connected to the base station BTS2 by means of cabling 21. The downlink BCCH signal of cell A is transmitted in the extension area A' at such a level that the mobile station in this area can decode the identifier BSIC of cell A. Further, the repeater and antenna 22 are positioned so that cell A and the extension A' do not significantly cause any disturbance to one another. The position of the repeater and antenna 22 in the extension area A' can be found by measuring the signal level of cell A, for example.

In the following, the effect of the extension area A' on handover is examined by means of an example. It is first assumed that the mobile station MS is connected to the serving cell S. When the mobile station MS moves towards the neighboring cell A, it will reach the extension area A' of the neighboring cell at position (3). At this position the mobile station MS is able to receive the BCCH carrier wave of cell A which is transmitted through the repeater and antenna 22 and thus is ready to start decoding the BSIC. When the BSIC is decoded, the MS will store the BSIC. When this BCCH carrier wave is no longer among the six strongest carrier waves, the BSIC should be retained for at least 10 seconds in compliance with the GSM Specification 0508. This time is equivalent to a distance of about 140 meters at a speed of 50 km/h. When the mobile station MS reaches the actual coverage area of the neighboring cell A at position (1), the identifier BSIC of the neighboring cell A is already decoded because of the extension area A'. Therefore in the case of a handover, cell A can be regarded as a possible target cell. If the mobile station MS moves fast in the area of cells S and A, it is possible to maintain the BSIC stored in the memory as long as is needed for moving from the area A' to the area A. If the mobile station MS moves slowly, it can lose the BSIC information between the areas A' and A but decode it again in the overlapping area OA of cells S and A. The mobile station transmits measuring reports via the is base station BTS1 to the base station controller BSC.

The base station controller BSC detects a need for a handover at position (2). This need can be detected for example on the basis of the low reception level of the serving cell S. When the need for a handover is detected, the call is transferred to a suitable neighboring cell. In this case, the target cell is cell A which has been found to be a suitable neighboring cell for a handover. This means that cell A has been identified by means of BSIC decoding and the reception level of cell A is sufficient for maintaining the call.

The invention is above described by using as an example cell S positioned in the tunnel. The invention is not in any way restricted to this example, but it can be applied in any shadow area of the network to eliminate the same problem. Cell S can for example be a cell inside a building and cell A a cell outside the building at the entrance. In that case, the extension area A' can be situated inside the building in the lobby before the entrance, for example. Further, cell S can be a cell inside a multi-story car-parking structure and cell A a cell inside the parking structure at the entrance. In that case, the extension area A' can be situated inside the parking structure before the exit, for example. Further, cell S can be a cell between tall buildings covering the street between them and cell A a cell covering an intersecting street.

When needed, the extension area can be formed by using one antenna, several antennas, a combination of an antenna and a repeater, a leaking (radiating) cable or any equipment with which a suitable type of downlink extension area is achieved in each special case.

The figures and the explanation related is thereto are only meant to illustrate the present invention. It is to be understood that changes can be made to the disclosed cellular system without deviating from the spirit and scope of the accompanying claims.

I claim:

1. A cellular mobile communications system in which a handover decision of a mobile station from a serving cell having a coverage area to a neighboring cell from among a plurality of other cells, and said neighboring cell having a basic coverage area which at least partially overlaps said said coverage area of said cell, and existence of at least one obstacle shadows downlink transmission capability of said neighboring cell so as otherwise to effectively cause insufficient overlapping of said serving and said neighboring cell to ensure that there is a sufficient period of time for reception and decoding of downlink transmissions of said neighboring cell and for executing a decision to handover said mobile station from said serving cell to said neighboring cell, said system further comprising:

at least one of a repeater and an antenna so arranged as to effectively extend said basic coverage area for said downlink transmissions of said neighboring cell by an extended coverage area into said coverage area of said serving cell, for advancing transmission and decoding downlink transmissions of said neighboring cell.

2. The cellular mobile communications system of claim 1, wherein;

said at least one of a repeater and an antenna is so arranged as to advance recognition of said neighboring cell as a potential target for a handover of said mobile station from said serving cell.

3. The cellular mobile communication system of claim 1, wherein:

said extended coverage area of said neighboring cell is non-overlapping in relation to said basic coverage area of said neighboring cell.

4. The cellular mobile communications system of claim 1, wherein:

said coverage area of said first cell extends from a base station primarily serving within a building, and said basic coverage area of said neighboring cell extends from a basic station primarily serving outside said building.

5. The cellular mobile communications system of claim 1, wherein:

said coverage area of said first cell extends from a base station primarily serving within a tunnel, and said coverage area of said neighboring cell extends from a base station primarily serving outside said tunnel.

6. The cellular mobile communications system of claim 1, wherein:

said at least one of a repeater and an antenna comprises a leaking cable.

7. The cellular mobile communications system of claim 1, wherein:

said at least one obstacle is constituted by at least one of at least one building, at least one tunnel and at least one terrain feature.

* * * * *